United States Patent
Ikeda et al.

(10) Patent No.: US 6,870,675 B2
(45) Date of Patent: Mar. 22, 2005

(54) VARIABLE OPTICAL ATTENUATOR

(75) Inventors: Keisuke Ikeda, Shizuoka (JP); Shohei Abe, Shizuoka (JP); Isao Kojima, Aichi (JP); Yuko Ota, Shizuoka (JP); Ikuo Maeda, Shizuoka (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 10/256,427

(22) Filed: Sep. 27, 2002

(65) Prior Publication Data

US 2003/0058533 A1 Mar. 27, 2003

(30) Foreign Application Priority Data

Sep. 27, 2001 (JP) ......................................... 2001-298007

(51) Int. Cl.[7] .............................................. G02B 27/28
(52) U.S. Cl. ...................... 359/484; 359/283; 359/494; 385/140
(58) Field of Search ......................... 385/140; 359/280, 359/281, 282, 283, 484, 494, 284; 349/18, 193

(56) References Cited

U.S. PATENT DOCUMENTS

| | | | | |
|---|---|---|---|---|
| 5,499,132 A | * | 3/1996 | Tojo et al. .................. | 359/281 |
| 6,018,411 A | * | 1/2000 | Fukushima et al. ......... | 359/283 |
| 6,055,104 A | * | 4/2000 | Cheng ......................... | 359/495 |
| 6,108,120 A | * | 8/2000 | Kawai et al. ................ | 359/283 |
| 6,195,479 B1 | * | 2/2001 | Pan ............................. | 385/18 |
| 6,417,952 B1 | * | 7/2002 | Kawai et al. ................ | 359/282 |
| 6,480,331 B1 | * | 11/2002 | Cao ............................ | 359/484 |
| 2002/0110346 A1 | * | 8/2002 | Ikeda et al. ................. | 385/140 |

FOREIGN PATENT DOCUMENTS

| | | | |
|---|---|---|---|
| EP | 0 932 067 A2 | * | 7/1999 |
| EP | 1 162 494 A1 | * | 12/2001 |
| JP | 2002-258229 A | * | 9/2002 |

* cited by examiner

Primary Examiner—John Juba, Jr.
(74) Attorney, Agent, or Firm—Harness, Dickey & Pierce, P.L.C.

(57) ABSTRACT

A variable optical attenuator is disclosed which comprises a plane-parallel birefringent element for separation/synthesis which separates light beams having orthogonal polarization directions on the same optical path, the birefringent element synthesizing light beams on different optical paths; a light converging lens disposed adjacent to the birefringent element for separation/synthesis; a reflecting mirror disposed at a focal point of the lens opposite to the birefringent element for separation/synthesis with respect to the lens; a variable polarization rotating device; and an input port and an output port which are disposed at the end of the birefringent element for separation/synthesis; the variable polarization rotating device being disposed at any position between the birefringent element for separation/synthesis and the reflecting mirror, the variable polarization rotating device controlling the rotational angle of the polarization direction of incident light beams from the input port, to thereby control the amount of reflected output light to the output port.

5 Claims, 8 Drawing Sheets

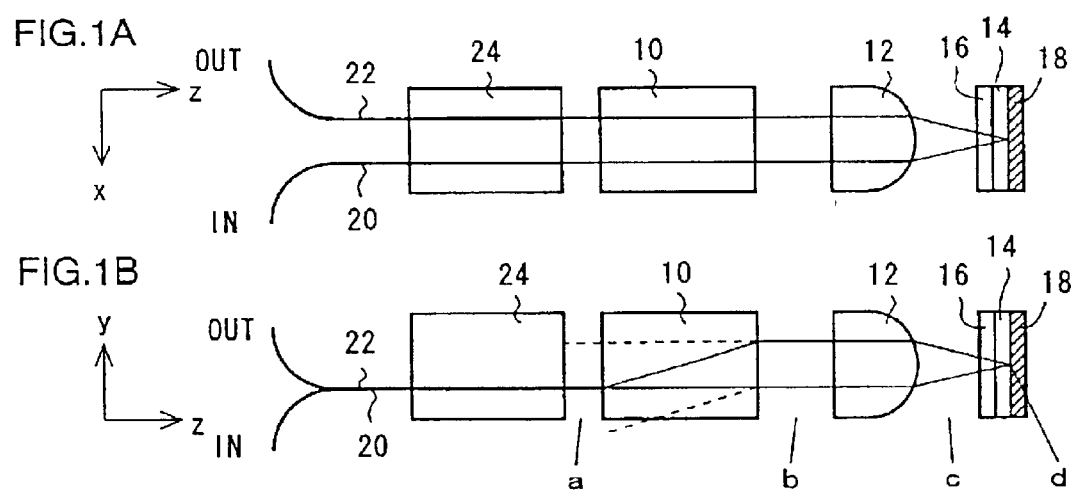

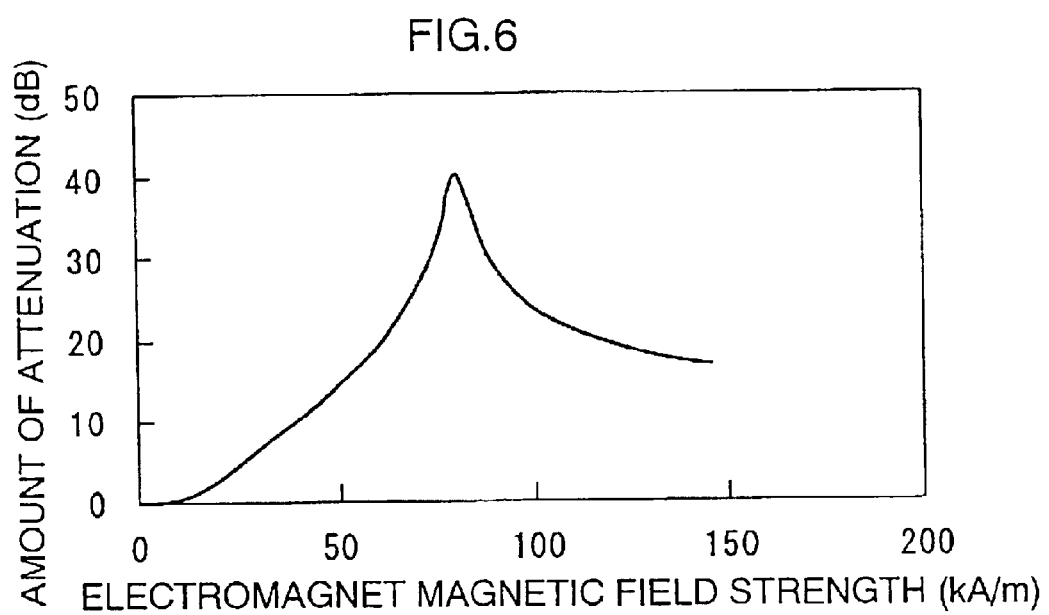

VARIABLE OPTICAL ATTENUATOR

CROSS-REFERENCE TO RELATED APPLICATIONS

The present application claims the priority from Japanese Patent Application No. 2001-298007 filed on Sep. 27, 2001, the full disclosure of which is incorporated herein by reference.

BACKGROUND OF THE INVENTION

1. Field of the Invention

The present invention relates generally to a reflection-type variable optical attenuator, and more particularly, to a variable optical attenuator having a birefringent element for separation/synthesis, a lens and a reflecting mirror, with an input port and an output port which are disposed toward the birefringent element for separation/synthesis, the variable optical attenuator capable of adjusting the amount of attenuation of incident light through control of the rotational angle of the polarization direction by use of a variable polarization rotating device interposed between the birefringent element for separation/synthesis and the reflecting mirror.

2. Description of the Related Arts

Optical communications systems or optical measurement systems necessitate optical attenuators for controlling the amount of transmitted light. This type of optical attenuators typically employ an opposed configuration having a polarizer and an analyzer disposed anterior (input side) and posterior (output side), respectively, to the optical axis of a Faraday rotational angle varying unit. The Faraday rotational angle varying unit incorporated therein serves to apply an external magnetic field to a Faraday element (e.g., a magnetic garnet single crystal film having Faraday effect) by use of, e.g., an electromagnet and vary the external magnetic field applied, thereby providing a control of the Faraday rotational angle of light beams passing through the Faraday element. The optical attenuators variably control the amount of attenuation of light through the control of the Faraday rotational angle.

Such optical attenuators could use, in principle, composite polarizing prisms as the polarizer and the analyzer, although use of the composite polarizing prisms would substantially halve the amount of incident light due to the presence of the polarizer. Thus, it would normally be practical for fiber coupled devices to employ polarization non-dependence type using a pair of wedge-shaped birefringent crystal plates (e.g., rutile crystals).

Incident light from an input fiber passes through the polarizer, the Faraday element of the Faraday rotational angle varying unit, and the analyzer in the mentioned order, and is coupled to an output fiber. The Faraday rotational angle is varied through the control of the variable magnetic field applied to the Faraday element, to thereby control the amount of light passing through the analyzer.

In the optical attenuator of the structure using the wedge-shaped birefringent crystal plates in a pair as the polarizer and the analyzer, however, the dimensional accuracy of the paired wedge-shaped birefringent crystal plates is essential, and poor pair accuracy adversely affects isolation characteristics. For this reason, the machining is extremely difficult, requiring a lot of cost of time and labor. Furthermore, the assembling step places importance on the accuracy of positioning in the direction orthogonal to the optical axis of the wedge-shaped birefringent crystal plate, and possible positional offsets may also adversely affect the isolation characteristics. Thus, the assembly adjustment also needs a lot of cost.

Of late years, the wavelength division multiplexing communications are being put to practical use, as a result of which the optical attenuator has come to be incorporated for each wavelength to equalize the insertion loss. In such a use, it is important in particular to achieve the manufacture at low cost as well as reduction in dimensions. Use of the wedge-shaped birefringent crystal plates is disadvantageous in this respect.

Due to such a conventional optical attenuator's opposed configuration allowing light to travel from one end of the device to the other (i.e., configuration where the input fiber and the output fiber are positioned at opposite ends), a wider space is needed to accommodate fibers excepting the case where the input and output are oppositely arranged, resulting in a reduced degree of freedom of mounting. Furthermore, for the electromagnet, a constituent element of the Faraday rotational angle varying unit, a large installation space is required in the direction orthogonal to the optical axis, making it hard to reduce the thickness of the unit.

SUMMARY OF THE INVENTION

It is therefore an object of the present invention to provide a variable optical attenuator having a less number of components required, whose optical components are easy to work, easy to assemble, and thus capable of manufacture at low cost, reduction in size and of being polarization non-dependence type. Another object of the present invention is to provide a variable optical attenuator having the input and output disposed on the same side of the device, to thereby increase the degree of freedom of mounting and be adapted for thinning.

In order to achieve the above and other objects, according to a first aspect of the present invention there is provided a variable optical attenuator comprising a plane-parallel birefringent element for separation/synthesis which separates light beams having orthogonal polarization directions on the same optical path, the birefringent element synthesizing light beams on different optical paths; a light converging lens disposed adjacent to the birefringent element for separation/synthesis; a reflecting mirror disposed at a focal point of the lens opposite to the birefringent element for separation/synthesis with respect to the lens; a variable polarization rotating device; and an input port and an output port which are disposed at the end of the birefringent element for separation/synthesis; the variable polarization rotating device being disposed at any position between the birefringent element for separation/synthesis and the reflecting mirror, the variable polarization rotating device controlling the rotational angle of the polarization direction of incident light beams from the input port, to thereby control the amount of reflected output light to the output port.

According to a second aspect of the present invention there is provided a variable optical attenuator comprising a plane-parallel birefringent element for separation/synthesis which separates light beams having orthogonal polarization directions on the same optical path, the birefringent element synthesizing light beams on different optical paths; a light converging lens disposed adjacent to the birefringent element for separation/synthesis; a reflecting mirror disposed at a focal point of the lens opposite to the birefringent element for separation/synthesis with respect to the light converging lens; a variable polarization rotating device; a fixed polarization rotating device; and an input port and an output port which are disposed at the end of the birefringent element for separation/synthesis; the variable polarization rotating device and the fixed polarization rotating device being disposed at any positions between the birefringent element for separation/synthesis and the reflecting mirror, the variable polarization rotating device controlling the rotational angle of the polarization direction of incident light beams from the input port, to thereby control the amount of reflected output light to the output port.

Incident light beams pass through the birefringent element for separation/synthesis and the lens, and gather on the reflecting mirror for reflection. The reflected return light beams again pass through the birefringent element for separation/synthesis and are output. In this process light beams go back and forth through the variable polarization rotating device or through the variable polarization rotating device and the fixed polarization rotating device (in fact, through their Faraday element portions).

Herein, a two-core ferrule may be provided such that an input fiber is positioned at the input port and that an output fiber is positioned at the output port.

The variable polarization rotating device typically includes a variable magnetic field applying device which can apply magnetic fields from two directions to vary a synthetic magnetic field thereof, and a basic film Faraday element whose Faraday rotational angle varies depending on the synthetic magnetic field. The fixed polarization rotating device typically include a compensating film Faraday element whose Faraday rotational angle is unvaried irrespective of the synthetic magnetic field applied.

In case of using the basic film Faraday element having Faraday rotational angle of 45 degrees, light beams go back and forth through the Faraday elements due to the reflection type of the invention, with the result that the Faraday rotational angle amounts to 90 degrees for back and forth even though one-way Faraday rotational angle is 45 degrees. In the event that a synthetic magnetic field is applied of a fixed magnetic field in the optical axis direction and of a variable magnetic field orthogonal thereto, the synthetic magnetic field cannot become orthogonal to the light traveling direction, and hence the range of the Faraday rotational angle results in approximately 5 to 90 degrees which in turn reduces the range of the amount of attenuation. In case of combination of the basic film Faraday element and the compensating film Faraday element, the range of the Faraday rotational angle becomes large as much as 0 to 90 degrees, which in turn increases the range of the amount of attenuation.

The plane-parallel birefringent element for separation/synthesis can be made of rutile crystal for example. As used herein, the "plane-parallel" refers to a geometric configuration having an entry surface and an exit surface which are parallel to each other (the entry surface need not be strictly normal to the incident light). The plane-parallel shape can include not only a parallel plate shape, but also a parallelogrammic block shape, a rectangular parallelepipedic shape, or the like.

BRIEF DESCRIPTION OF THE DRAWINGS

The above and other objects, aspects, features and advantages of the present invention will become more apparent from the following detailed description when taken in conjunction with the accompanying drawings, in which:

FIGS. 1A and 1B are explanatory diagrams of optical paths showing an embodiment of a variable optical attenuator in accordance with the present invention;

FIG. 6 is a graphical representation showing the relationship between the electromagnet magnetic field strength and attenuation characteristics, obtained when combining the 55-degree basic film Faraday element with the −10-degree compensating film Faraday element;

DETAILED DESCRIPTION OF THE INVENTION

Figure 2A:
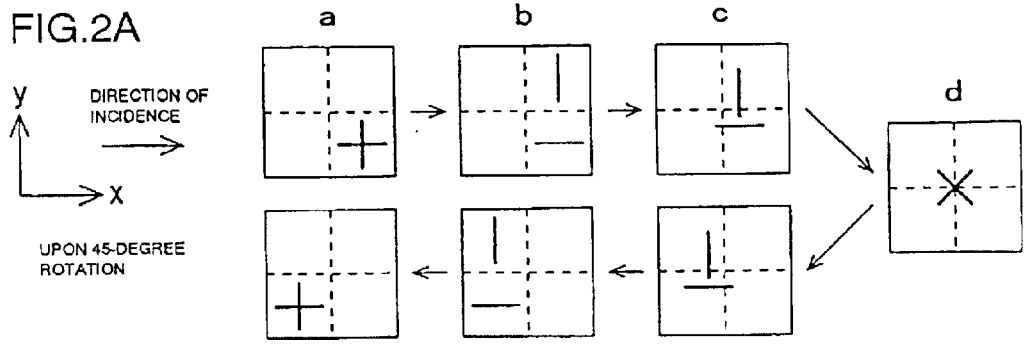
FIGS. 2A to 2C are explanatory diagrams of states of polarization between optical components of the variable optical attenuator.
Figure 2B:
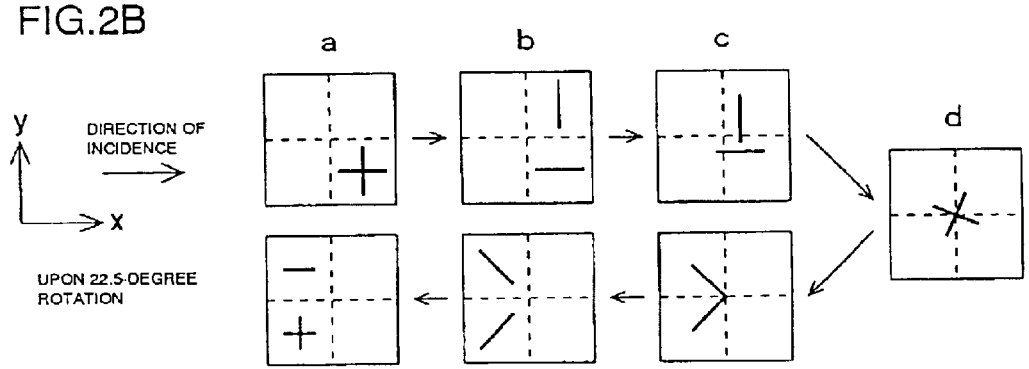
Figure 2C:
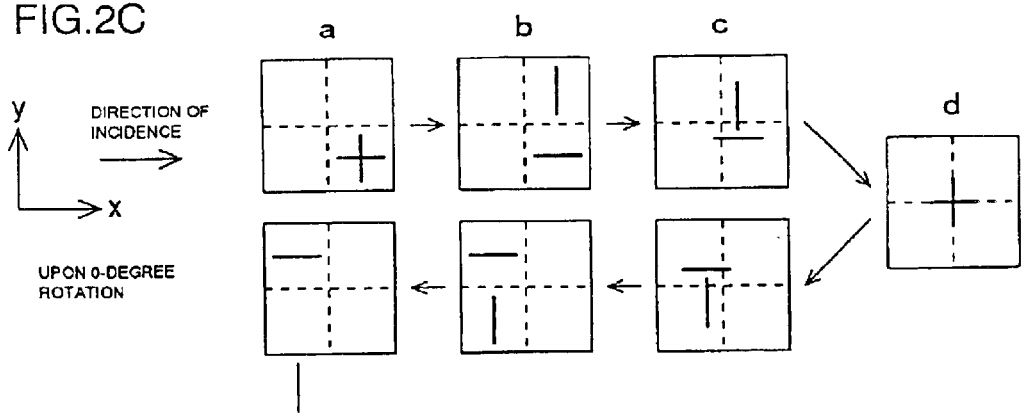

FIGS. 1A and 1B are explanatory diagrams of optical paths showing an embodiment of a variable optical attenuator in accordance with the present invention, and FIGS. 2A to 2C are explanatory diagrams of states of polarization between optical components of the variable optical attenuator. To facilitate understanding of the description, coordinates axes are defined as follows: z direction (rightward direction in the diagrams) represents the direction in which the optical components are arrayed (i.e., the direction in which incident light travels), with x direction (horizontal direction) and y direction (vertical direction) being two directions orthogonal to z direction. This means that FIG. 1A is a top plan view and that FIG. 1B is a front view. The states of polarization indicated at "a" to "d" of FIGS. 2A to 2C are obtained when viewed toward the direction in which light beams travel at positions indicated at "a" to "d" of FIG. 1B.

The variable optical attenuator comprises, in the mentioned order, a plane-parallel birefringent element 10 for separation/synthesis which separates light beams having orthogonal polarization directions and traveling toward z direction along the same optical path, in y direction, and which synthesizes light beams traveling toward −z direction along different optical paths, in −y direction, a convex lens 12, a basic film Faraday element 14 and a compensating film Faraday element 16 in a pair, and a reflecting mirror 18 positioned at a focal point of the convex lens 12. An input port and an output port are arranged on a lateral side (left-hand side in the diagram) of the birefringent element 10 for separation/synthesis. In this embodiment a two-core ferrule 24 is provided such that an input fiber 20 is positioned at the input port associated with the lower right optical path when viewed z direction whilst an output fiber 22 is positioned at the output port associated with the lower left optical path. The optical fibers may be substituted by optical waveguides, etc.

The birefringent element 10 for separation/synthesis is comprised of a plate-parallel type rutile crystal. This embodiment has a reflection type configuration including a single birefringent element which functions as both the polarizer and the analyzer. The basic film Faraday element 14 varies the Faraday rotational angle in response to a synthetic magnetic field formed by magnetic fields applied from two directions. The compensating film Faraday element 16 keeps the Faraday rotational angle substantially unvaried irrespective of the synthetic magnetic field and has a Faraday rotational direction different from that of the basic film Faraday element. In other words, materials are selected such that the Faraday rotational directions of the basic film Faraday element and of the compensating film Faraday element are opposite to each other. It is preferred that the magnetic field applying device be shared at least partly by the variable polarization rotating device and the fixed polarization rotating device, but instead two dedicated magnetic field applying device may separately be provided. In this embodiment the magnetic field applying device, not shown, are configured to apply a fixed magnetic field by a permanent magnet in the direction where light travels and apply a variable magnetic field by an electromagnet in the direction orthogonal to the light traveling direction. In this case the arrangement is such that both the fixed magnetic field and the variable magnetic field are applied to the basic film Faraday element and the compensating film Faraday element.

Description will then be made of operations of the variable optical attenuator.

Faraday Rotational Angle: 45 Degrees

FIG. 2A shows the case of total Faraday rotational angle being 45 degrees which is achieved by both the basic film Faraday element 14 and the compensating film Faraday element 16. Of light beams input in z direction from the input fiber 20, an ordinary light beam goes straight on through the birefringent element 10 for separation/synthesis whereas an extraordinary light beam is refracted thereat and optically separated in y direction. The two light beams are then condensed by the convex lens 12, in the course of which they pass through the compensating film Faraday element 16 and the basic film Faraday element 14. Due to the Faraday rotational angle being set to 45 degrees, the two light beams undergo 45-degree rotations of the polarization directions and reach the reflecting mirror 18 positioned at the lens focal point, for reflection. The reflected light beams returning in −z direction again pass through the basic film Faraday element 14 and the compensating film Faraday element 16, and at that time experience additional 45-degree (thus, 90 degrees in total) rotations of the polarization directions, resulting in parallel light beams by the action of the convex lens 12. At the birefringent element 10 for separation/synthesis, ordinary light beams along the lower optical paths go straight on but extraordinary light beams along the upper optical paths are refracted in −y direction, and hence all the light beams are polarization synthesized and coupled to the output fiber 22. Thus, in the case of 45-degree Faraday rotational angle, substantially all the amount of incident light can emerge from the output fiber 22 without substantial attenuation.

Faraday Rotational Angle: 0 Degrees

FIG. 2C shows the case of total Faraday rotational angle being 0 degrees which is achieved by both the basic film Faraday element 14 and the compensating film Faraday element 16. Of light beams input in z direction from the input fiber 20, an ordinary light beam goes straight on through the birefringent element 10 for separation/synthesis whereas an extraordinary light beam is refracted thereat and optically separated in y direction. The two light beams are then condensed by the convex lens 12, in the course of which they pass through the compensating film Faraday element 16 and the basic film Faraday element 14. Due to the Faraday rotational angle being set to 0 degrees, the two light beams undergo no rotations of the polarization directions and reach the reflecting mirror 18 positioned at the lens focal point, for reflection. The reflected light beams returning in −z direction again pass through the basic film Faraday element 14 and the compensating film Faraday element 16, and at that time as well experience no rotations of the polarization directions, resulting in parallel light beams by the action of the convex lens 12. At the birefringent element 10 for separation/synthesis, ordinary light beams along the upper optical paths go straight on but extraordinary light beams along the lower optical paths are refracted in −y direction. Thus, substantially no incident light beams from the input fiber 20 are coupled to the output fiber 22. In other words, almost all of the incident light beams from the input fiber become attenuated.

Faraday Rotational Angle: 22.5 Degrees

Following is the case of total Faraday rotational angle being any angle between 0 to 45 degrees which is achieved by both the basic film Faraday element 14 and the compensating film Faraday element 16. FIG. 2B shows the case of 22.5 degrees for example. Of light beams input in z direction from the input fiber 20, an ordinary light beam goes straight on through the birefringent element 10 for separation/synthesis whereas an extraordinary light beam is refracted thereat for optical separation in y direction. The two light beams are then condensed by the convex lens 12, in the course of which they pass through the compensating film Faraday element 16 and the basic film Faraday element 14. Due to the presence of the compensating film Faraday element 16 and the basic film Faraday element 14, the two light beams undergo rotations of the polarization directions through any angle (22.5 degree in FIG. 2B) and reach the reflecting mirror 18 positioned at the lens focal point, for reflection. The reflected light beams returning in −z direction again pass through the basic film Faraday element 14 and the compensating film Faraday element 16, and at that time as well experience additional rotations through the same angle (22.5 degrees in this case, thus, a total of 45 degrees), resulting in parallel light beams by the action of the convex lens 12. At the birefringent element 10 for separation/synthesis, ordinary light components along the lower optical paths go straight on but extraordinary light components along the upper optical paths are refracted in −y direction, and hence those light components are polarization synthesized for coupling to the output fiber 22. However, ordinary light components along the upper optical paths goes straight on therethrough but extraordinary light components along the lower optical paths are refracted thereat in −y direction, with the result that those components are not coupled to the output fiber. Accordingly, the incident light beams from the input fiber 20 are attenuated (in case of 22.5-degree Faraday rotational angle, the amount of incident light is substantially halved) for the output to the output fiber 22.

Thus, the amount of attenuation (in other words, the amount of reflected output light) of incident light beams can freely be adjusted by controlling the rotational angle of polarization directions by means of the basic film Faraday element 14.

Figure 3:
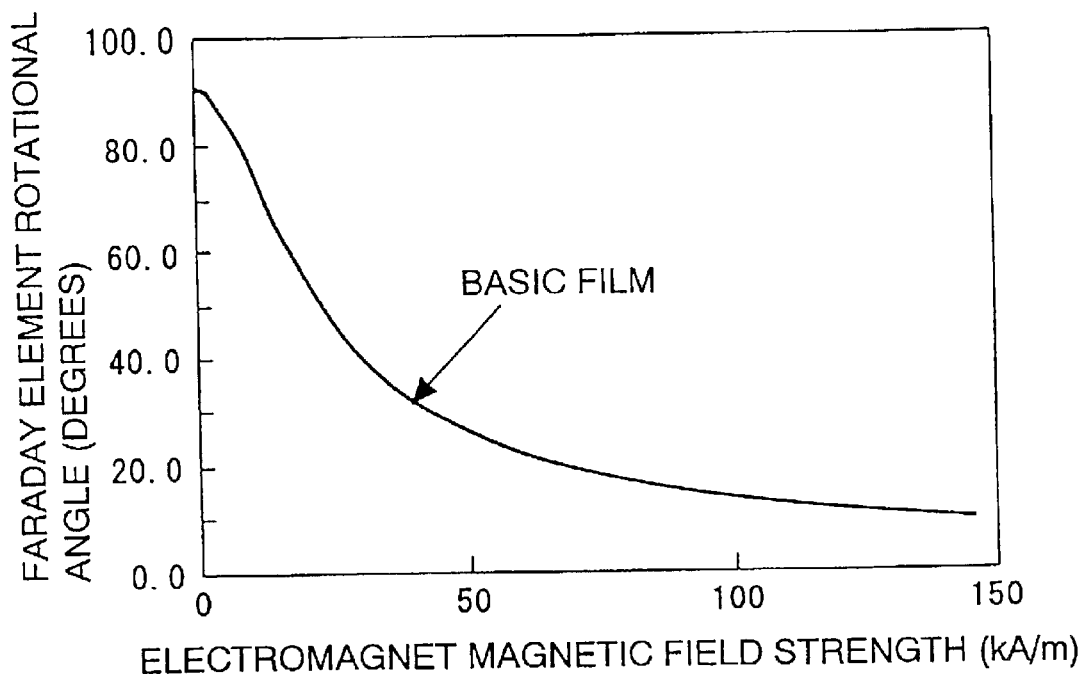
FIG. 3 is a graphical representation showing the relationship between the electromagnet magnetic field strength and Faraday rotational angle, obtained when using only a 45-degree basic film Faraday element.
Figure 4:
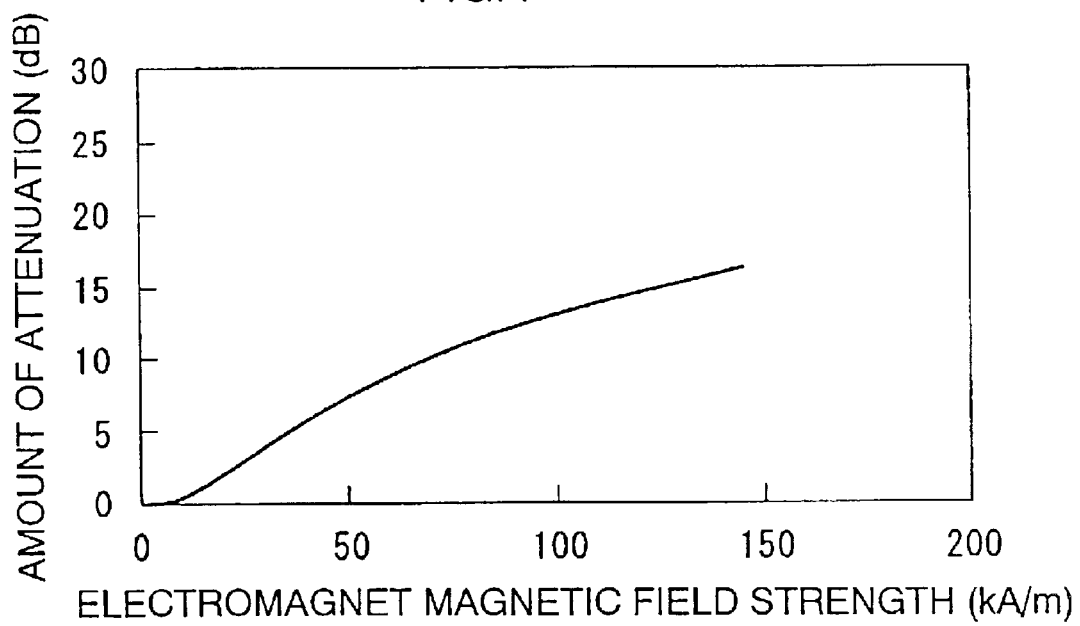
FIG. 4 is a graphical representation showing the relationship between the electromagnet magnetic field strength and attenuation characteristics, obtained when using only the 45-degree basic film Faraday element.

Referring to FIGS. 3 and 4 are shown in graphical representations the relationship between the electromagnet magnetic field strength and Faraday rotational angle, and the relationship between the electromagnet magnetic field strength and attenuation characteristics, respectively, obtained when using only a 45-degree basic film Faraday element. Although use of only the 45-degree basic film Faraday element also ensures functions as the variable optical attenuator, the range of the Faraday rotational angle will be limited to approximately 8 to 90 degrees due to the capabilities of the electromagnet used (since the synthetic magnetic field cannot completely point to the direction orthogonal to the optical axis), whereupon the maximum amount of attenuation will result in approximately 15 dB.

Figure 5:
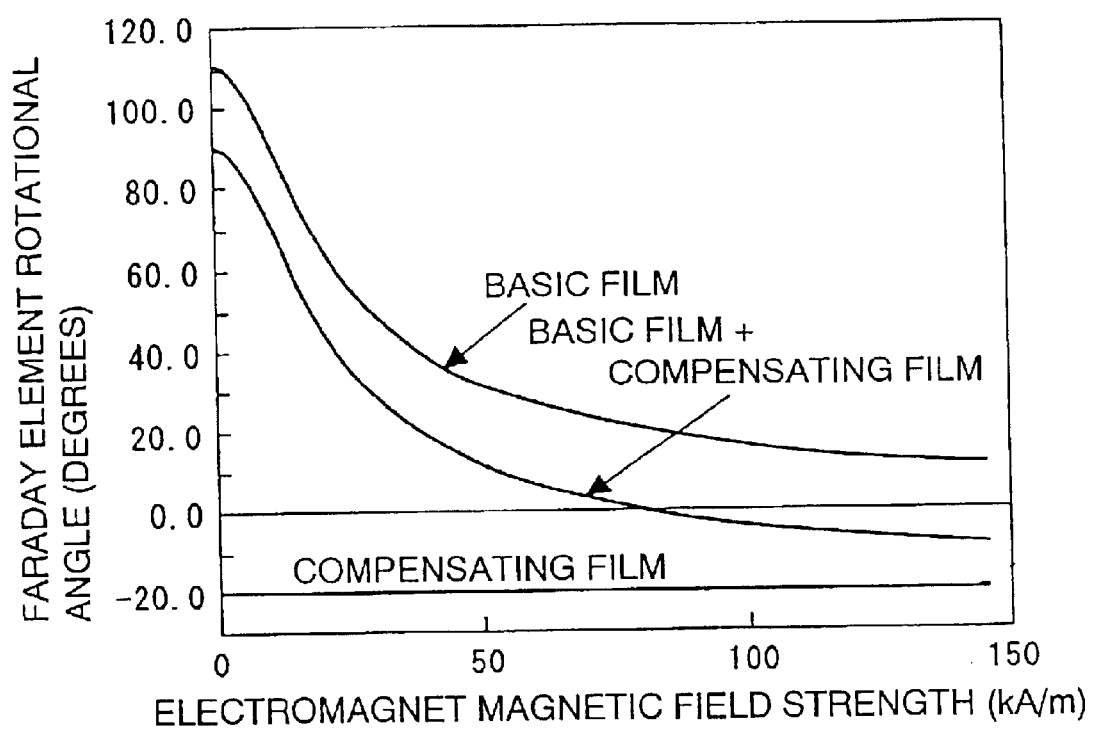
FIG. 5 is a graphical representation showing the relationship between the electromagnet magnetic field strength and Faraday rotational angle, obtained when combining a 55-degree basic film Faraday element with a −10-degree compensating film Faraday element.

On the contrary, FIGS. 5 and 6 show in graphical representations the relationship between the electromagnet magnetic field strength and Faraday rotational angle, and the relationship between the electromagnet magnetic field strength and attenuation characteristics, respectively, obtained when combining a 55-degree basic film Faraday element with a −10-degree compensating film Faraday element. Herein, the basic film Faraday element can be a magnetic garnet LPE film with a composition, e.g., $Tb_{1.00}Y_{0.65}B_{1.35}Fe_{4.05}Ga_{0.95}O_{12}$, and the compensating film Faraday element can be a magnetic garnet LPE film with a composition, e.g., $Gd_{1.00}Y_{0.75}Bi_{1.25}Fe_{4.00}Ga_{1.00}O_{12}$. Such a combination would allow the range of the Faraday rotational angle to increase up to −10 to 90 degrees, thus achieving the maximum amount of attenuation of the order of 40 dB.

Although the present invention has been described by way of an embodiment thereof, it will be appreciated that the invention is not limited to only the above configuration. The positions to dispose the basic film Faraday element and the compensating film Faraday element are not limited to the example of FIG. 1. FIGS. 7A to 7D show other embodiments. For simplicity of description, identical reference numerals are imparted to optical components corresponding to those of FIG. 1.

Figure 7A:
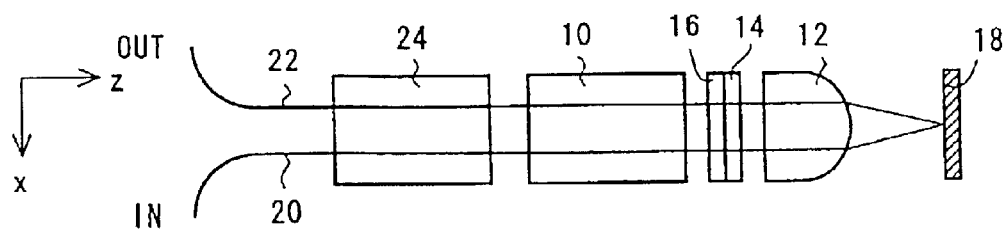
FIGS. 7A to 7D are explanatory diagrams of optical paths showing other embodiments of the variable optical attenuator in accordance with the present invention.
Figure 7B:
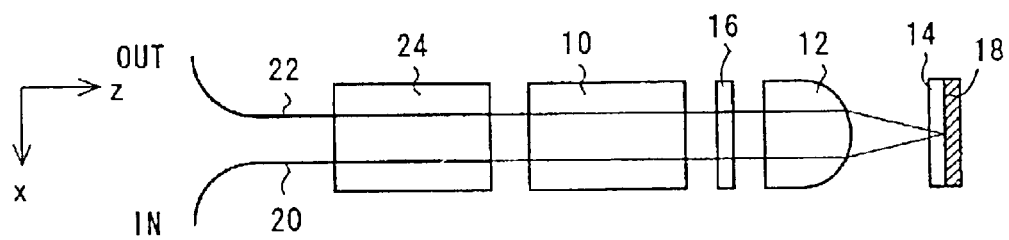
Figure 7C:
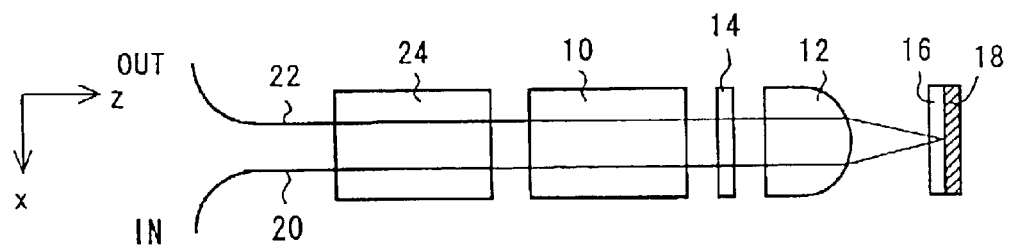
Figure 7D:
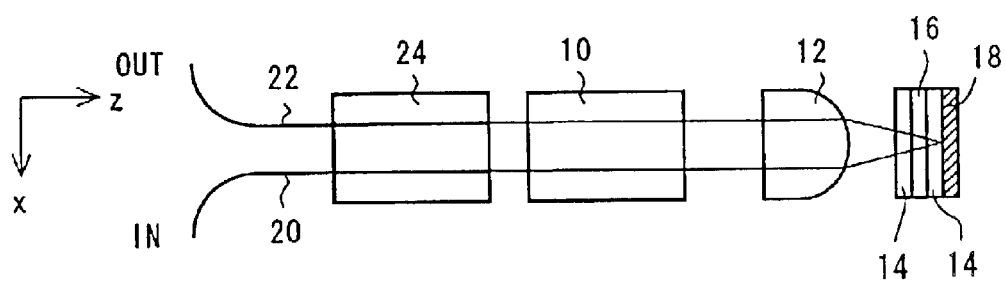

In an example shown in FIG. 7A, the basic film Faraday element 14 and the compensating film Faraday element 16 are arranged between the birefringent element 10 for separation/synthesis and the lens 12. Although the same applies to the case of FIG. 7A, the order of the basic film Faraday element 14 and the compensating film Faraday element 16 may be inverted. In another example shown in FIG. 7B, the basic film Faraday element 14 is interposed between the lens 12 and the reflecting mirror 18, with the compensating film Faraday element 16 intervening between the birefringent element 10 for separation/synthesis and the lens 12. Inversely, in a further example shown in FIG. 7C, the basic film Faraday element 14 is interposed between the birefringent element 10 for separation/synthesis and the lens 12, with the compensating film Faraday element 16 intervening between the lens 12 and the reflecting mirror 18.

In the event of disposing one or more basic film Faraday elements and one or more compensating film Faraday elements as well, they could be arranged at any positions as long as they lie between the birefringent element 10 for separation/synthesis and the reflecting mirror 18. In a yet further example shown in FIG. 7D, two basic film Faraday elements and a single compensating film Faraday element are disposed side by side between the lens 12 and the reflecting mirror 18 in order of, from left to right, the basic film Faraday element 14, the compensating film Faraday element 16 and the basic film Faraday element 14.

Table 1 shows the results of study of the relationship between the basic film rotational angle and the compensating film rotational angle where the insertion loss at the electromagnet magnetic field strength 0 falls to 1 dB or below. A large amount of attenuation of 25 dB or more can be obtained if the compensating film rotational angle is −3 degrees or less when the basic film rotational angle is 61 degrees or and if the compensating film rotational angle is within range shown in Table 1 when the basic film rotational angle 61 degrees or more.

TABLE 1

| Basic Film Maximum Rotational Angle $\theta_1$ (degrees) | Compensating Film Maximum Rotational Angle $\theta_2$ (degrees) |
|---|---|
| 40 | $\theta_2 \geq -8$ |
| 42 | $\theta_2 \geq -10$ |
| 44 | $\theta_2 \geq -12$ |
| 46 | $\theta_2 \geq -14$ |
| 48 | $\theta_2 \geq -16$ |
| 50 | $\theta_2 \geq -18$ |
| 52 | $\theta_2 \geq -20$ |
| 54 | $\theta_2 \geq -22$ |
| 56 | $\theta_2 \geq -24$ |
| 58 | $\theta_2 \geq -26$ |
| 60 | $\theta_2 \geq -28$ |
| 61 | $-29 \leq \theta_2 \leq -3$ |
| 62 | $-30 \leq \theta_2 \leq -4$ |
| 64 | $-32 \leq \theta_2 \leq -6$ |
| 66 | $-34 \leq \theta_2 \leq -8$ |
| 68 | $-36 \leq \theta_2 \leq -9$ |
| 70 | $-38 \leq \theta_2 \leq -11$ |
| 72 | $-40 \leq \theta_2 \leq -13$ |
| 74 | $-42 \leq \theta_2 \leq -15$ |
| 76 | $-44 \leq \theta_2 \leq -17$ |
| 78 | $-46 \leq \theta_2 \leq -19$ |
| 80 | $-48 \leq \theta_2 \leq -21$ |
| 82 | $-50 \leq \theta_2 \leq -23$ |
| 84 | $-52 \leq \theta_2 \leq -25$ |
| 86 | $-54 \leq \theta_2 \leq -27$ |
| 88 | $-56 \leq \theta_2 \leq -29$ |
| 90 | $-58 \leq \theta_2 \leq -31$ |

Figure 8:
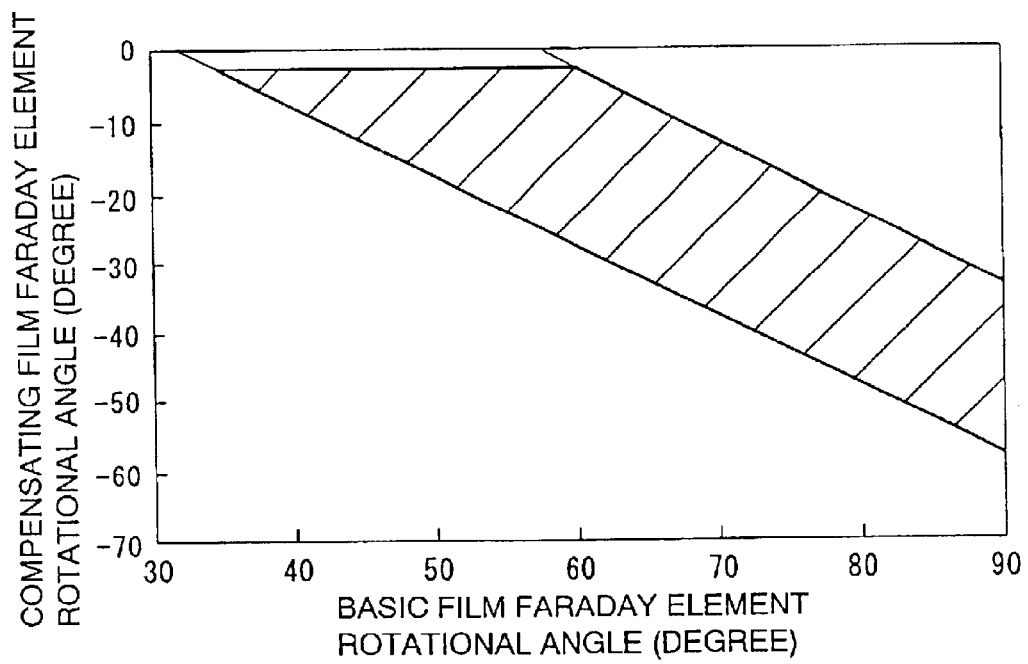
FIG. 8 is an explanatory diagram showing the relationship between Faraday rotational angles of the basic film Faraday element and of the compensating film Faraday element where the insertion loss is small at the electromagnet magnetic field strength of 0 and a large amount of attenuation is achieved.

The hatched region of FIG. 8 represents the relationship between Faraday rotational angles of the basic film Faraday element and of the compensating film Faraday element where the insertion loss is small at the electromagnet magnetic field strength of 0 and a large amount of attenuation is achieved. Representing this by numerical expressions, it is desirable to satisfy the relationships:

if $\theta_1 \leq 61$ degrees, then $32-\theta_1 \leq \theta_2 \leq -3$, and if $\theta_1 \geq 61$ degrees, then $32-\theta_1 \leq \theta_2 \leq 58-\theta_1$ where $\theta_1$ is a maximum rotational angle achieved by the basic film Faraday element, and $\theta_2$ is a maximum rotational angle achieved by the compensating film Faraday element.

More specifically, the fixed magnetic field applying device are comprised of an axially magnetized, annular permanent magnet disposed on the optical axis, whilst the variable magnetic field applying device are in the form of an electromagnet with a C-shaped magnetic core around which the winding is placed, the electromagnetic having a gap in which the basic film Faraday element is positioned. Since the variable optical attenuator of the present invention is of a reflection type having no optical paths on the backside of the reflecting mirror, the space behind the reflecting mirror can be utilized to accommodate the electromagnet, thereby allowing the components to be placed in a planar arrangement which is effective for reducing the thickness of the variable optical attenuator.

As compared with the conventional opposition type optical attenuator, the reflection type variable optical attenuator configured by the embodiments of the present invention is capable of presenting equivalent performances in spite of its space-saved configuration with less number of components. The variable optical attenuator in accordance with an embodiment of the present invention has the input port and output port which are located in the same direction, thus adding to the degree of freedom of mounting to obtain the structure suited for the thinning. Furthermore, reduction in the number of components enables it to be manufactured at low cost.

According to an embodiment of the present invention, due to light passing therethrough back and forth, the thickness of the Faraday elements can be reduced to half as compared with the conventional opposition type, which also contributes to the lowering of the cost. The combined basic film Faraday element and compensating film Faraday element enable the range of Faraday rotational angle to be increased, thus adding to the maximum amount of attenuation up to of the order of 40 dB to achieve satisfactory characteristics.

Although the present invention has been set forth hereinabove by way of exemplary embodiments, it will be apparent to those skilled in the art that the invention described herein could variously be changed or modified without departing from the spirit of the invention. It is therefore to be construed that such changes and modifications fall within the scope of the present invention.

What is claimed is:

1. A variable optical attenuator comprising:
   a plane-parallel birefringent element for separation/synthesis which separates light beams having orthogonal polarization directions on the same optical path, said birefringent element synthesizing light beams on different optical paths;
   a light converging lens disposed adjacent to said birefringent element for separation/synthesis;
   a reflecting mirror disposed at a focal point of said lens opposite to said birefringent element for separation/synthesis with respect to said light converging lens;
   a variable polarization rotating device including a basic film Faraday element whose Faraday rotational angle varies depending on a variable synthetic magnetic field, and magnetic field applying device which applies external magnetic fields to said basic film Faraday element from two or more directions to thereby vary a synthetic magnetic field thereof;
   a fixed polarization rotating device including a compensating film Faraday element having different Faraday rotational direction from that of said basic film Faraday element, and a magnetic field applying device which applies external magnetic fields to said compensating film Faraday element from one or more directions; and
   an input port and an output port which are disposed at the end of said birefringent element for separation/synthesis;
   said variable polarization rotating device and said fixed polarization rotating device being disposed at any positions between said birefringent element for separation/synthesis and said reflecting mirror,
   said variable polarization rotating device controlling the rotational angle of the polarization direction of incident light beams from said input port, to thereby control the amount of reflected output light to said output port, and relationships:
   if $\theta_1 \leq 61$ degrees the
   $32 - \theta_1 \leq \theta_2 \leq -3$, and
   if $\theta_1 \geq 61$ degrees, then
   $32 - \theta_1 \geq \theta_2 \geq 58 - \theta_1$ being satisfied where $\theta_1$ is a maximum rotational angle achieved by said basic film Faraday element, and $\theta_2$ is a maximum rotational angle achieved by said compensating film Faraday element.

2. A variable optical attenuator comprising:
   a plane-parallel birefringent element for separation/synthesis which separates light beams having orthogonal polarization directions on the same optical path, said birefringent element synthesizing light beams on different optical paths;
   a light converging lens disposed adjacent to said birefringent element for separation/synthesis;
   a reflecting mirror disposed at a focal point of said lens opposite to said birefringent element for separation/synthesis with respect to said light converging lens;
   a variable polarization rotating device;
   a fixed polarization rotating device; and
   an input port and an output port which are disposed at the end of said birefringent element for separation/synthesis;
   said variable polarization rotating device controlling the rotational angle of the polarization direction of incident light beams from said input port, to thereby control the amount of reflected output light to said output port, wherein
   said variable polarization rotating device is disposed between said light converging lens and said reflecting mirror, said fixed polarization rotating device being disposed between said birefringent element for separation/synthesis and said light converging lens.

3. A variable optical attenuator comprising:
   a plane-parallel birefringent element for separation/synthesis which separates light beams having orthogonal polarization directions on the same optical path, said birefringent element synthesizing light beams on different optical paths;
   a light converging lens disposed adjacent to said birefringent element for separation/synthesis;
   a reflecting mirror disposed at a focal point of said lens opposite to said birefringent element for separation/synthesis with respect to said light converging lens;
   a variable polarization rotating device;
   a fixed polarization rotating device; and
   an input port and an output port which are disposed at the end of said birefringent element for separation/synthesis;
   said variable polarization rotating device controlling the rotational angle of the polarization direction of incident light beams from said input port, to thereby control the amount of reflected output light to said output port, wherein
   said fixed polarization rotating device is disposed between said light converging lens and said reflecting mirror, said variable polarization rotating device being disposed between said birefringent element for separation/synthesis and said light converging lens.

4. A variable optical attenuator comprising:
   a plane-parallel birefringent element for separation/synthesis which separates light beams having orthogonal polarization directions on the same optical path, said birefringent element synthesizing light beams on different optical paths;
   a light converging lens disposed adjacent to said birefringent element for separation/synthesis;

a reflecting mirror disposed at a focal point of said lens opposite to said birefringent element for separation/synthesis with respect to said light converging lens;

a variable polarization rotating device;

a fixed polarization rotating device; and an input port and an output port which are disposed at the end of said birefringent element for separation/synthesis;

said variable polarization rotating device controlling the rotational angle of the polarization direction of incident light beams from said input port, to thereby control the amount of reflected output light to said output port, wherein said variable polarization rotating device and said fixed polarization rotating device are disposed between said light converging lens and said birefringent element for separation/synthesis.

5. A variable optical attenuator comprising:

a plane-parallel birefringent element for separation/synthesis which separates light beams having orthogonal polarization directions on the same optical path, said birefringent element synthesizing light beams on different optical paths;

a light converging lens disposed adjacent to said birefringent element for separation/synthesis;

a reflecting mirror disposed at a focal point of said lens opposite to said birefringent element for separation/synthesis with respect to said light converging lens;

a variable polarization rotating device;

a fixed polarization rotating device; and an input port and an output port which are disposed at the end of said birefringent element for separation/synthesis;

said variable polarization rotating device controlling the rotational angle of the polarization direction of incident light beams from said input port, to thereby control the amount of reflected output light to said output port, wherein said fixed polarization rotating device is directly sandwiched by two said variable polarization rotating devices, said fixed polarization rotating device being interposed together with said two variable polarization rotating devices between said light converging lens and said reflecting mirror.

* * * * *

UNITED STATES PATENT AND TRADEMARK OFFICE
CERTIFICATE OF CORRECTION

| | |
|---|---|
| PATENT NO. | : 6,870,675 B2 |
| APPLICATION NO. | : 10/256427 |
| DATED | : March 22, 2005 |
| INVENTOR(S) | : Keisuke Ikeda et al. |

It is certified that error appears in the above-identified patent and that said Letters Patent is hereby corrected as shown below:

Column 9

Line 63, Claim 1: "the" should be --then--

Line, 66, Claim 1: "$\geqq$" should be -- $\leqq$ --, both occurrences

Signed and Sealed this

Twenty-first Day of November, 2006

JON W. DUDAS
*Director of the United States Patent and Trademark Office*